United States Patent
Phillips et al.

(10) Patent No.: US 7,383,067 B2
(45) Date of Patent: Jun. 3, 2008

(54) MOBILE WIRELESS COMMUNICATIONS DEVICE COMPRISING INTEGRATED ANTENNA AND KEYBOARD AND RELATED METHODS

(75) Inventors: Robert Phillips, Waterloo (CA); Robert Campbell Yule, Cambridge (CA)

(73) Assignee: Research in Motion Limited, Waterloo, Ontario (CA)

( * ) Notice: Subject to any disclaimer, the term of this patent is extended or adjusted under 35 U.S.C. 154(b) by 598 days.

(21) Appl. No.: 11/048,216

(22) Filed: Feb. 1, 2005

(65) Prior Publication Data

US 2006/0172785 A1   Aug. 3, 2006

(51) Int. Cl.
*H04Q 7/32* (2006.01)
(52) U.S. Cl. .............. 455/575.1; 455/550.1; 455/575.7; 455/90.3; 455/422.1; 455/556.1; 379/433.01; 379/433.07; 379/428.01; 379/429; 343/702; 343/700; 343/718
(58) Field of Classification Search ............ 455/575.1, 455/550.1, 575.2, 575.3, 575.4, 90.1, 90.2, 455/90.3, 556.1, 557, 422.1, 517, 500, 73; 379/433.01, 433.07, 428.01, 429; 343/702, 343/700, 718; 340/531, 539
See application file for complete search history.

(56) References Cited

U.S. PATENT DOCUMENTS

| | | | |
|---|---|---|---|
| 5,361,061 A | 11/1994 | Mays et al. | 340/825.44 |
| 5,561,437 A | 10/1996 | Phillips et al. | 343/702 |
| 5,572,223 A | 11/1996 | Phillips et al. | 343/702 |
| 5,712,645 A | 1/1998 | Jellum et al. | 454/713 |
| 6,186,400 B1 | 2/2001 | Dvorkis et al. | 235/462.45 |
| 6,380,930 B1 | 4/2002 | Van Ruymbeke | 345/173 |
| 6,725,070 B2 | 4/2004 | Kuroda | 455/575.1 |
| 6,850,195 B2 | 2/2005 | Onaka et al. | 343/700 |
| 6,954,181 B2* | 10/2005 | Park et al. | 343/702 |
| 2002/0033772 A1 | 3/2002 | Johnson et al. | 343/702 |
| 2002/0098862 A1 | 7/2002 | Engstrom | 455/550 |
| 2003/0027590 A1* | 2/2003 | Nakamura et al. | 455/550 |
| 2003/0040338 A1* | 2/2003 | Saito | 455/562 |
| 2004/0057578 A1 | 3/2004 | Brewer | 379/433.1 |
| 2004/0108959 A1 | 6/2004 | Park et al. | 343/702 |
| 2004/0196190 A1 | 10/2004 | Mendolia et al. | 343/700 |

(Continued)

FOREIGN PATENT DOCUMENTS

GB    2 325 348    11/1998

(Continued)

OTHER PUBLICATIONS

JP Publication No. 8-97622, dated Apr. 12, 1996, 8 pages.

(Continued)

*Primary Examiner*—Keith Ferguson
(74) *Attorney, Agent, or Firm*—Allen, Dyer, Doppelt, Milbrath & Gilchrist, P.A.

(57) ABSTRACT

A mobile wireless communications device includes a housing and main circuit board carried by the housing and having circuitry thereon. A keyboard circuit board is carried by the lower portion of the housing and has a keyboard section and keyboard circuitry thereon connected to circuitry on the main circuit board. An antenna section on the keyboard circuit board is configured as an antenna and positioned at the lower portion of the housing and has a pattern of conductive traces forming an antenna circuit and connected to the circuitry on the main circuit board. The keyboard circuit board preferably comprises a flex circuit.

26 Claims, 9 Drawing Sheets

U.S. PATENT DOCUMENTS

| | | | |
|---|---|---|---|
| 2004/0204009 A1 | 10/2004 | Cheng et al. | 455/550.1 |
| 2005/0001767 A1 | 1/2005 | Wulff et al. | 343/700 |

FOREIGN PATENT DOCUMENTS

| | | |
|---|---|---|
| GB | 2 358 315 | 7/2001 |
| GB | 2 364 849 | 2/2002 |
| WO | 94/19873 | 9/1994 |
| WO | 99/63616 | 12/1999 |
| WO | 00/30268 | 5/2000 |
| WO | 01/24310 | 9/2000 |
| WO | 00/67342 | 11/2000 |
| WO | 01/24310 | 4/2001 |
| WO | 01/33723 | 5/2001 |
| WO | 2005/120107 | 12/2005 |

OTHER PUBLICATIONS

Patent Abstracts of Japan, Publication No. 9-181637, published Jul. 11, 1997, 4 pages.

JP Publication No. 2002-51125, dated Feb. 15, 2002, 6 pages.

JP Utility Model Publication for Opposition No. 2-21765, dated May 12, 1990, 4 pages.

Patent Abstracts of Japan, Publication No. 2003-283225, published Oct. 3, 2003, 9 pages.

Japanese National Phase PCT Publication No. 2003-513580, dated Apr. 8, 2003, 23 pages.

Japanese National Phase PCT Publication No. 11-512909, dated Nov. 2, 1999, 19 pages.

Japanese Publication No. 2004-128605, dated Apr. 22, 2004, 16 pages.

Patent Abstracts of Japan, Publication No. 09-321529, published Dec. 12, 1997, 1 page.

\* cited by examiner

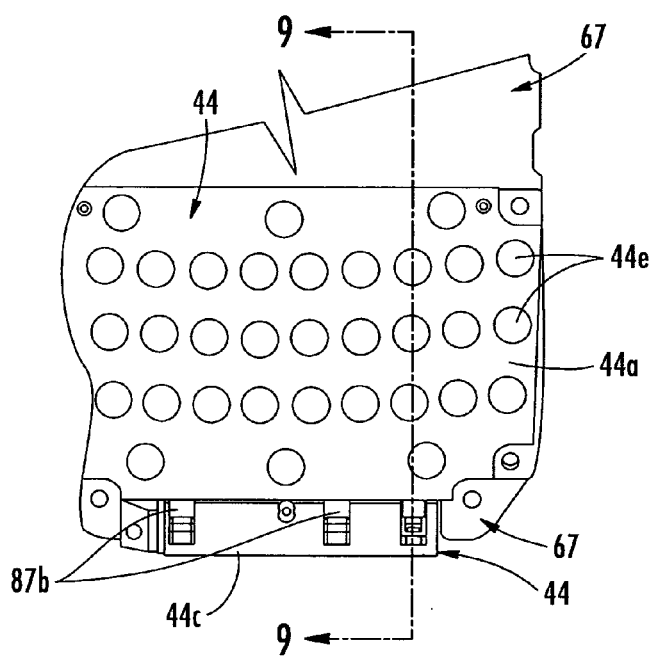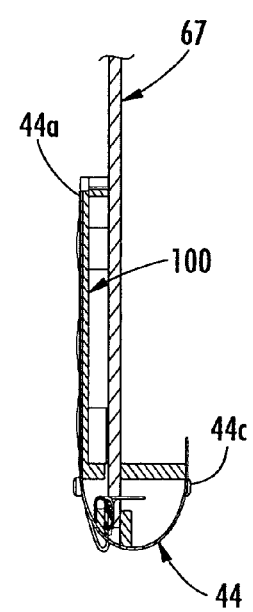
FIG. 8                    FIG. 9

MOBILE WIRELESS COMMUNICATIONS DEVICE COMPRISING INTEGRATED ANTENNA AND KEYBOARD AND RELATED METHODS

FIELD OF THE INVENTION

The present invention relates to the field of communications devices, and more particularly, to mobile wireless communications devices and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. As a result, one style of cellular telephones which has gained wide popularity is the folding or "flip" phone. Flip phones typically have an upper housing with a display and speaker, and a lower housing or flap which carries the microphone. The keypad on such phones may be on either the upper housing or the lower housing, depending upon the particular model. The lower flap is connected to the upper housing by a hinge so that when not in use the upper and lower housings can be folded together to be more compact.

One example of a flip phone is disclosed in U.S. Pat. No. 5,337,061 to Pye et al. The phone has two antennas, a first one of which is mounted on the lower flap and includes a ground plane and an active monopole fed by a coaxial feed from electronic circuitry inside the phone. The flap is pivotally connected to the main or upper section of the housing, and is folded against the main section when not in use. Another similar antenna is fitted in the main section, and both antennas are connected to transceiver circuitry in the phone. The antennas are designed to introduce deliberate mismatch to provide an effective switching system between the antennas without the need for separate circuit elements.

The antenna configuration of a cellular telephone may also significantly effect the overall size or footprint of the phone. Cellular telephones typically have antenna structures that support communications in multiple operating frequency bands. Various types of antennas for mobile devices are used, such as helix, "inverted F", folded dipole, and retractable antenna structures, for example. Helix and retractable antennas are typically deployed outside, i.e., on the exterior of, a mobile device, and inverted F and folded dipole antennas are typically within (i.e., on the interior of) a mobile device case or housing adjacent the top thereof.

Generally speaking, internal antennas allow cell phones to have a smaller footprint than do external antennas. Moreover, they are also are preferred over external antennas for mechanical and ergonomic reasons. Internal antennas are also protected by the mobile device housing and therefore tend to be more durable than external antennas, which may be cumbersome and make the mobile device difficult to use, particularly in limited-space environments.

Yet, one potential drawback of typical internal cellular phone antennas is that they are in relatively close proximity to the user's head when the phone is in use. As an antenna moves closer to a user's body, the amount of radio frequency (RF) energy radiation absorbed by the body will typically increase. The amount of RF energy absorbed by a body when using a mobile phone is called the specific absorption rate (SAR), and the allowable SAR for mobile phones is typically limited by applicable government regulations to ensure safe user RF energy exposure levels.

One attempt to reduce radiation exposure from cell phone antennas is set forth in U.S. Pat. No. 6,741,215 to Grant et al. This patent discloses various cellular phones with internal and external antenna configurations in which the antennas are positioned at the bottom of the phone to reduce radiation intensity experienced by a user, i.e., by moving the antenna farther away from the user's brain. Further, in some embodiments the housing of the phone forms an obtuse angle so that the bottom portion of the housing angles away from the user's face.

Despite such antenna configurations which allow for reduced radiation exposure, further advancements in antenna configurations, particularly internal antennas, now allow for further reductions in overall device size while still providing relatively low SAR values.

When designing these mobile wireless communications devices using improved antenna designs, however, it is also desirable to use subassemblies that are low in cost and consolidate several parts. Any subassemblies that are placed together should preferably be self-aligning and self-connecting. Some prior art devices have reduced cost by using a separate, main circuit board or radio board with circuitry operative as a radio transceiver, and a separate antenna that could be located on the housing of the mobile wireless communications device or internally, such as at the lower portion of a housing, and separate from any keyboard circuit board or other major circuit boards. Some wireless communications devices have used flex circuits as part of a main circuit board to remove some of the "hard" tooling.

SUMMARY OF THE INVENTION

In view of the foregoing background, it is therefore an object of the present invention to provide a mobile wireless communications device that includes an antenna design that can be incorporated as a subassembly with at least a keyboard circuit board to reduce complexity.

It is yet another object of the present invention to provide a mobile wireless communications device that incorporates a reduced number of subassembly components that can be fitted together in an efficient manner.

These and other objects, features and advantages, in accordance with the present invention, are provided by a mobile wireless communications device, which may include a housing having an upper portion and a lower portion. A main circuit board is carried by the housing and has circuitry thereon. A keyboard circuit board is carried by the lower portion of the housing and has a keyboard section and keyboard circuitry thereon connected to circuitry on the main circuit board. An antenna section is configured as an antenna and positioned at the lower portion in the housing and has a pattern of conductive traces forming an antenna circuit and connected to the circuitry on the main circuit board.

In one aspect of the present invention, the keyboard circuit board comprises a flex circuit. The keyboard section is substantially planar configured and the main circuit board has a lower portion. The antenna section in a preferred embodiment straddles both sides of the lower portion of the main circuit board, although this is not required. The circuitry on the main circuit board is preferably disposed on one side, although this is not required. An audio output transducer is carried by the upper portion of the housing and connected to the circuitry on the main circuit board. A keyboard support engages the main circuit board and the keyboard circuit board and supports the keyboard section and antenna section. Contact arms are positioned on the antenna section and engage the keyboard support to aid in securing together the keyboard circuit board and keyboard support. A compression connector preferably connects the keyboard circuitry to circuitry on the main circuit board. Pins align together the keyboard circuit board and main circuit board. Contacts are positioned on the antenna section and interconnect the antenna circuit to circuitry on the main circuit board. These contacts can comprise spring contacts.

In yet another aspect of the present invention, the keyboard support is carried by the housing within the lower portion and has a substantially planar keyboard support section and antenna support section. The main circuit board is carried by the housing and has circuitry thereon and has a lower portion secured to the antenna support section of the keyboard support. The keyboard circuit board is supported by the keyboard support and has a keyboard section and keyboard circuitry thereon connected to circuitry on the main circuit board and engaging and supported by the keyboard support section. An antenna section is configured as an antenna and has a pattern of conductive traces forming an antenna circuit and connected to circuitry on the main circuit board. The antenna section is supported by the antenna frame.

A method aspect of the invention is also disclosed.

BRIEF DESCRIPTION OF THE DRAWINGS

Other objects, features and advantages of the present invention will become apparent from the detailed description of the invention which follows, when considered in light of the accompanying drawings in which:

FIG. 8 is an enlarged plan view of the keyboard circuit board.

FIG. 9 is another sectional view taken along line 9-9 of FIG. 8 and showing the relative relationship and size of the keyboard support, main circuit board and keyboard circuit board, as one non-limiting example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
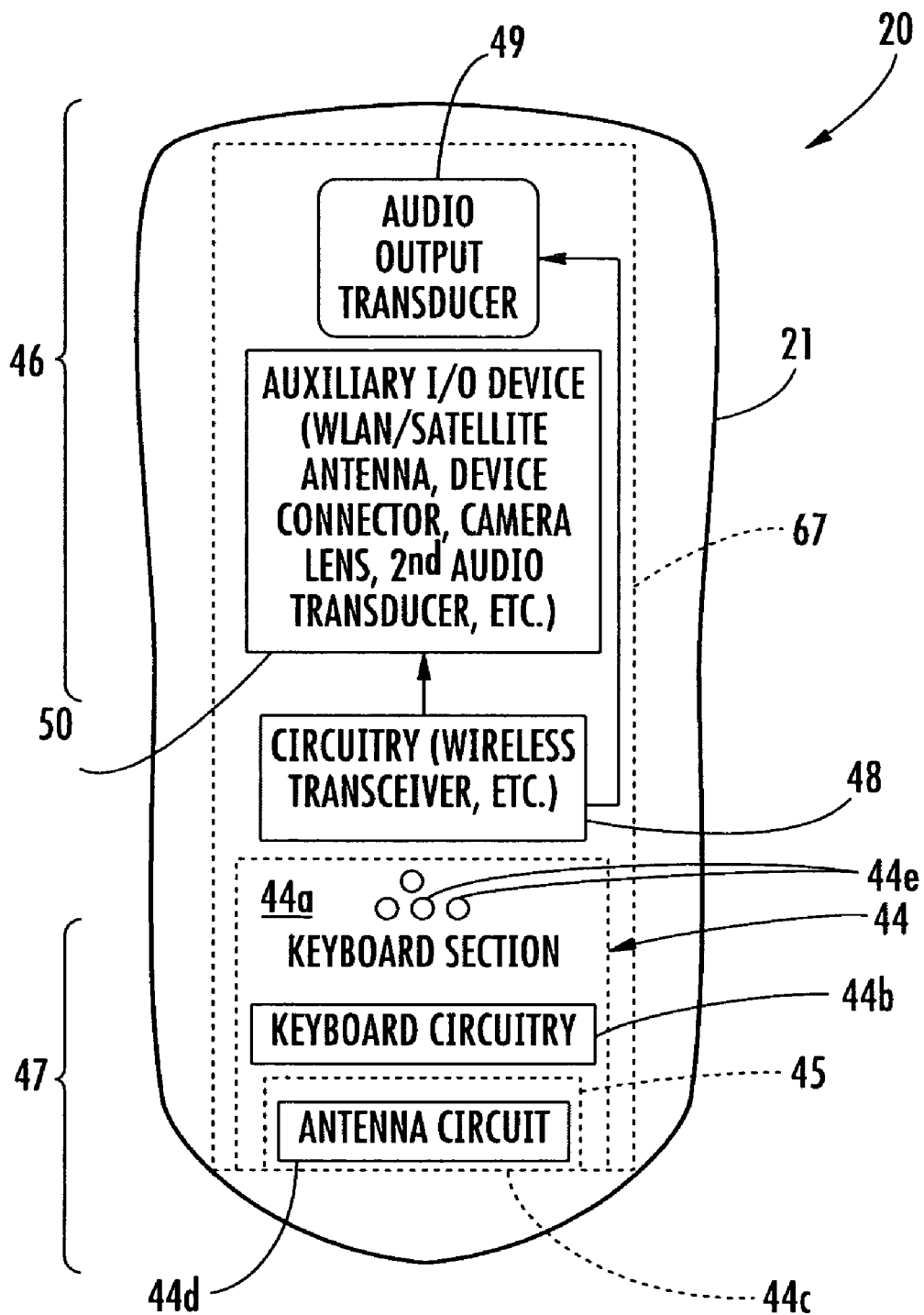
FIG. 1 is a schematic block diagram of an example of a mobile wireless communications device in accordance with the present invention and illustrating certain internal components thereof.
Figure 2:
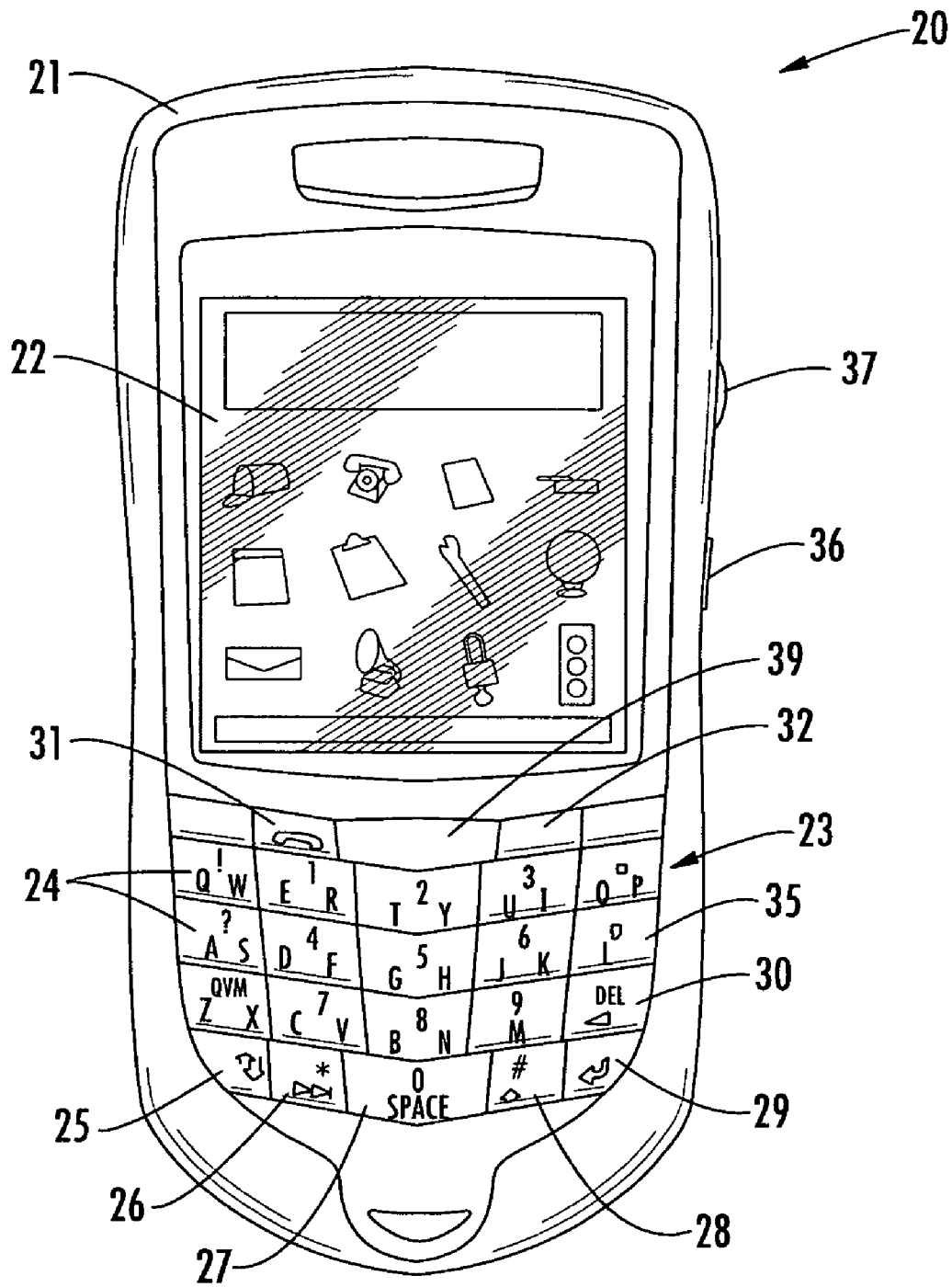
FIG. 2 is a front elevational view of the mobile wireless communications device of FIG. 1.

Referring initially to FIGS. 1 and 2, a mobile wireless communications device, such as a mobile cellular device 20, in accordance with the present invention is first described. The cellular device 20 illustratively includes a housing 21 having an upper portion 46 and a lower portion 47, and a main dielectric substrate 67, such as a printed circuit board (PCB) substrate, for example, carried by the housing. The term circuit board 67 as used hereinafter can refer to any dielectric substrate, PCB, ceramic or other structure for carrying signal circuits within a mobile wireless communications device. The illustrated housing 21 is a static housing, for example, as opposed to a flip or sliding housing which are used in many cellular telephones. However, these and other housing configurations may also be used.

Circuitry 48 is carried by the circuit board 67, such as a microprocessor, memory, one or more wireless transceivers (e.g., cellular, WLAN, etc.), audio and power circuitry, etc., as will be appreciated by those skilled in the art, and as will be discussed further below. A battery (not shown) is also preferably carried by the housing 21 for supplying power to the circuitry 48.

Furthermore, an audio output transducer 49 (e.g., a speaker) is carried by an upper portion 46 of the housing 21 and connected to the circuitry 48. One or more user input interface devices, such as a keypad 23 (FIG. 2), is also preferably carried by the housing 21 and connected to the circuitry 48 in a manner to be explained below. Other examples of user input interface devices include a scroll wheel 37 and a back button 36. Of course, it will be appreciated that other user input interface devices (e.g., a stylus or touch screen interface) may be used in other embodiments.

As illustrated in FIG. 1, a separate keyboard circuit board 44 is carried by the lower portion 47 of the housing and has a keyboard section 44a and keyboard circuitry 44b thereon connected to circuitry 48 on the main circuit board 67. An antenna section 44c is configured as an antenna 45 and positioned at the lower portion 47 in the housing as part of the keyboard circuit board 44 and has a pattern of conductive traces forming an antenna circuit 44d that physically forms the antenna and connected to the circuitry 48 on the main circuit board 67, as will be explained in greater detail below with reference to FIGS. 3-9. The antenna 45 is formed in the antenna section 44*c*. Appropriate integrated domes 44*e* operatively engage keypad buttons and are formed on the keyboard section 44*a*.

As indicated, the cellular device 20 further illustratively includes the antenna 45 as part of the keyboard circuit board 44 carried within the lower portion 47 of the housing 21 and comprising a pattern of conductive traces on the antenna section to form the antenna circuit and antenna. By placing the antenna 45 adjacent the lower portion 47 of the housing 21, this advantageously increases the distance between the antenna and the user's head when the phone is in use to aid in complying with applicable SAR requirements.

More particularly, a user will typically hold the upper portion of the housing 21 very close to his head so that the audio output transducer 49 is directly next to his ear. Yet, the lower portion 47 of the housing 21 where an audio input transducer (i.e., microphone) is located need not be placed directly next to a user's mouth, and is typically held away from the user's mouth. That is, holding the audio input transducer close to the user's mouth may not only be uncomfortable for the user, but it may also distort the user's voice in some circumstances. In addition, the placement of the antenna 45 adjacent the lower portion 47 of the housing 21 also advantageously spaces the antenna farther away from the user's brain.

Another important benefit of placing the antenna 45 adjacent the lower portion 47 of the housing 21 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Still another benefit of this configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22 carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25-29) are arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile cellular device 20 may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well.

To conserve space, the antenna 45 may advantageously be implemented in three dimensions although it may be implemented in two-dimensional or planar embodiments as well.

Figure 3:
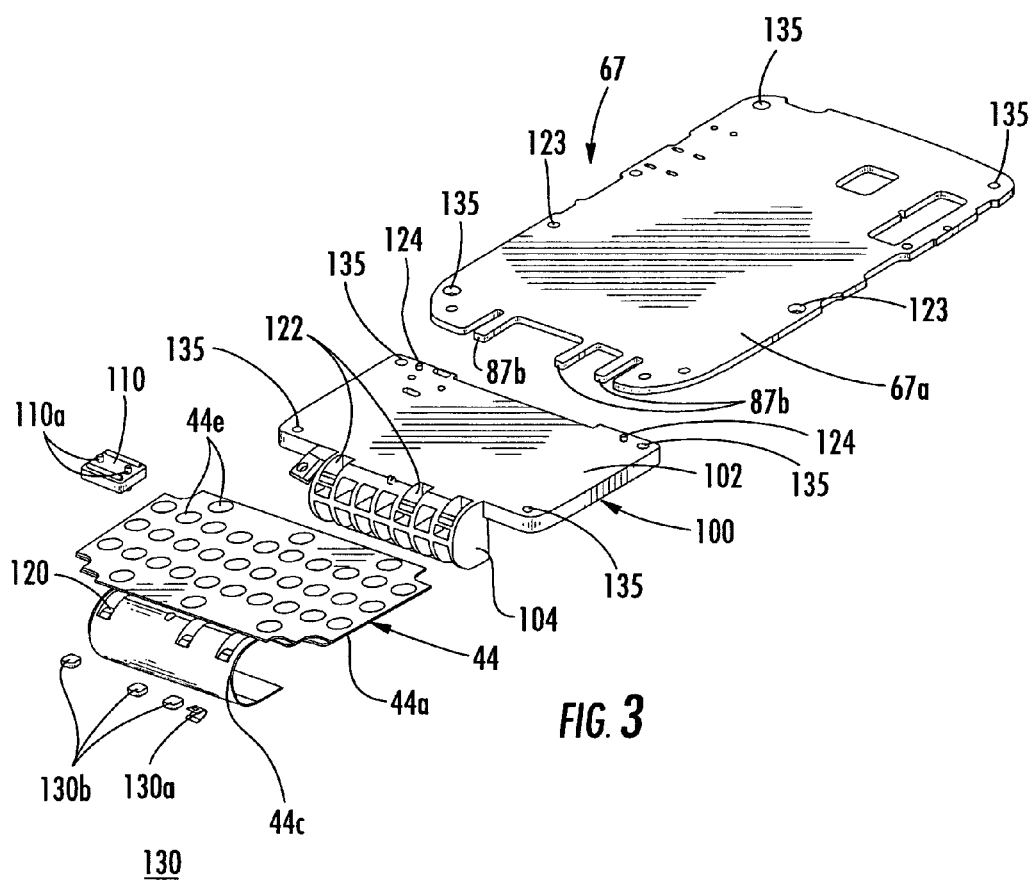
FIG. 3 is an exploded isometric view of the keyboard circuit board, keyboard support, and main circuit board that would be assembled together in an order looking from the lower left to the upper right respectively.

The antenna section 44*c* forms somewhat of a semicircle shape or C configuration, as best shown in FIG. 3. Although the configuration is shown as the preferred semicircular or C configuration, other configurations can be used. To permit the formation of the keyboard circuit board 44 into the desired configuration, which includes an antenna 45, the keyboard circuit board 44 is formed as a flex circuit board, also termed a flex circuit or flex board, which is an alternative to conventional printed wiring boards and other wiring. A flex circuit fits only one way for fewer wiring errors and ease of assembly. A flex circuit includes all the advantages of a printed circuit board, including repeatability, reliability, and high density while allowing three-dimensional configurations as shown in FIGS. 3-9. The flex circuit can be formed from supplies originating from many different companies, including a flex circuit by Minco of Minneapolis, Minn. These could include single-layer, double-layer, multi-layer, rigid flex, and multi-layer with plated and no plated through holes as non-limiting examples. The construction could include a copper clad and polyimide substrate with an adhesive, polyimide cover and an access hole. Other holes could be copper plated. A two-shot molding method could be used. This method allows selective plating and three-dimensional circuitry to be placed on the surface of complex parts.

Figure 5:
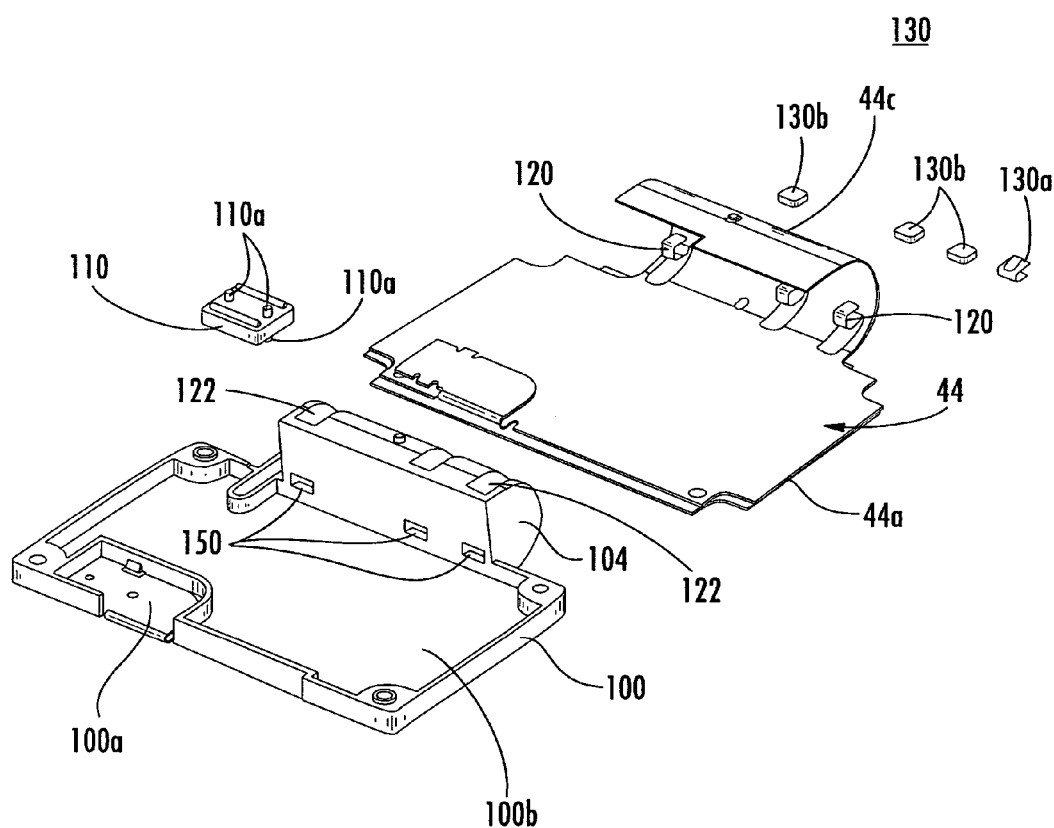
FIG. 5 is an exploded isometric view of the underside of the keyboard support and keyboard circuit board and associated parts.
Figure 6:
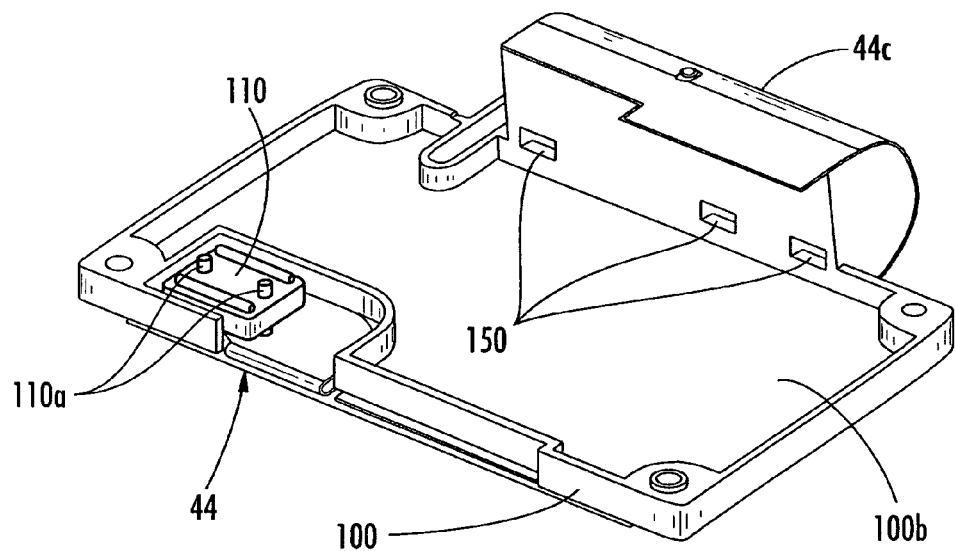
FIG. 6 is an isometric view of the keyboard support and keyboard circuit board and associated parts and showing the interconnection among the boards and associated parts.

FIG. 3 is an exploded isometric view of the main circuit board 67, the keyboard support 100, which would be carried by the housing 21 within the lower portion 47. The keyboard support 100 has a substantially planar keyboard section 102 and antenna support section 104. The keyboard circuit board 44 is supported by the keyboard support 100 and, as noted before, includes a keyboard section 44a and keyboard circuitry 44b thereon, such as the illustrated integrated domes 44e. The keyboard circuitry 44b connects to circuitry 48 on the main circuit board 67 using a compression connector 110 that is supported by the underside of the keyboard support 100 as shown in FIGS. 5 and 6. It has connecting posts 110a that could connect to the main circuit board 67 and allow interconnection of circuitry 48 on the main circuit board to keyboard circuitry 44b. As shown in FIG. 6, the compression connector 110 is fitted within a receiving slot 100a on the underside 100b of the keyboard support 100.

Figure 4:
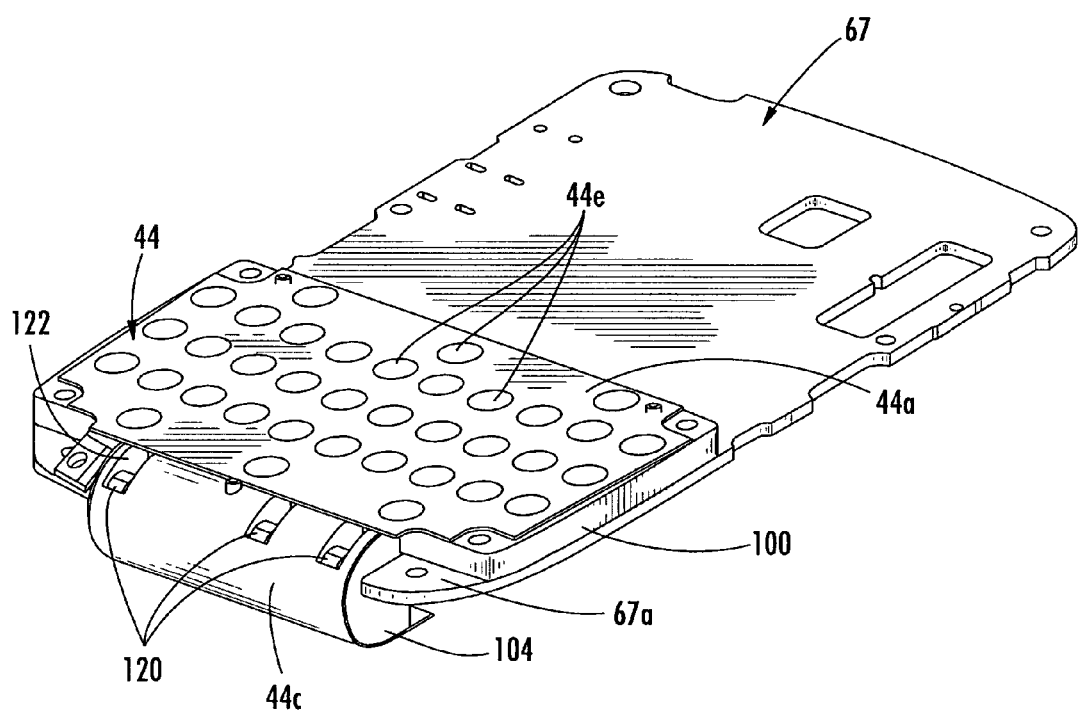
FIG. 4 is an isometric view showing the interconnection among the keyboard support, main circuit board and keyboard circuit board that would all be positioned within a housing of the mobile wireless communications device shown in FIGS. 1 and 2.

FIG. 4 shows the keyboard support 100, main circuit board 67 and keyboard circuit board 44 connected together. As illustrated, the main circuit board 67 has a lower portion 67a and the antenna section 44c of the keyboard circuit board 44 and the antenna support section 104 straddles both sides of the lower portion of the main circuit board, although this is not required. This design is beneficial because prior art designs typically used a main circuit board that was positioned on only one side of an internal antenna. The structure shown in FIG. 4 allows greater flexibility in antenna design and allows the use of larger patterns and new antenna geometries because it offers the ability to place the antenna elements much farther apart than some previous designs. The antenna configuration can also allow beam shaping.

The circuitry 48 on the main circuit board can also be disposed on one side or both sides. One side can be preferred because this facilitates assembly and preserves a single-sided radio board construction. It is thus self-aligning and self-correcting, and the keyboard circuit board 44 can be snapped into place with the keyboard support 100 and the main circuit board 67.

Contact arms 120 formed similar to springs as extensions or cuts are preferably formed on the antenna section 44c and engage the keyboard support 100 to aid in securing together the keyboard circuit board 44 and keyboard support 100. These contact arms 120 are formed similar to springs as shown in FIG. 5 and engage receiving slots 122 in the antenna support section of the keyboard support 100 to aid in securing together the keyboard circuit board 44 and keyboard support 100.

FIG. 3 shows various support alignment holes 123 in the main circuit board and locating posts 124 on the keyboard support 100 to align the main circuit board and keyboard support together. Conductive contacts 130 are positioned on the antenna section 44c and interconnect conductive traces forming the antenna circuit to circuitry 67 on the main circuit board. In one aspect of the invention, the conductive contacts 130 comprise a spring contact or finger that could be formed as a mechanical spring 130a or conductive elastomeric pad 130b, such as shown in FIGS. 3 and 5. It is evident that the single flex circuit forming the keyboard circuit board 44 contains both the antenna geometry and the electrical network necessary for the keyboard. There is a selective metallization and circuitry to form the antenna pattern. In one aspect of the present invention, the keyboard support 100 can be formed from plastic or other similar, but lightweight rigid material. The keyboard support 100 and main circuit board 67 each include guide and/or mounting holes 135 at each corner that receive fasteners or other guide pins to align or secure the assembled structure such as shown in FIG. 4 within the housing.

Figure 7:
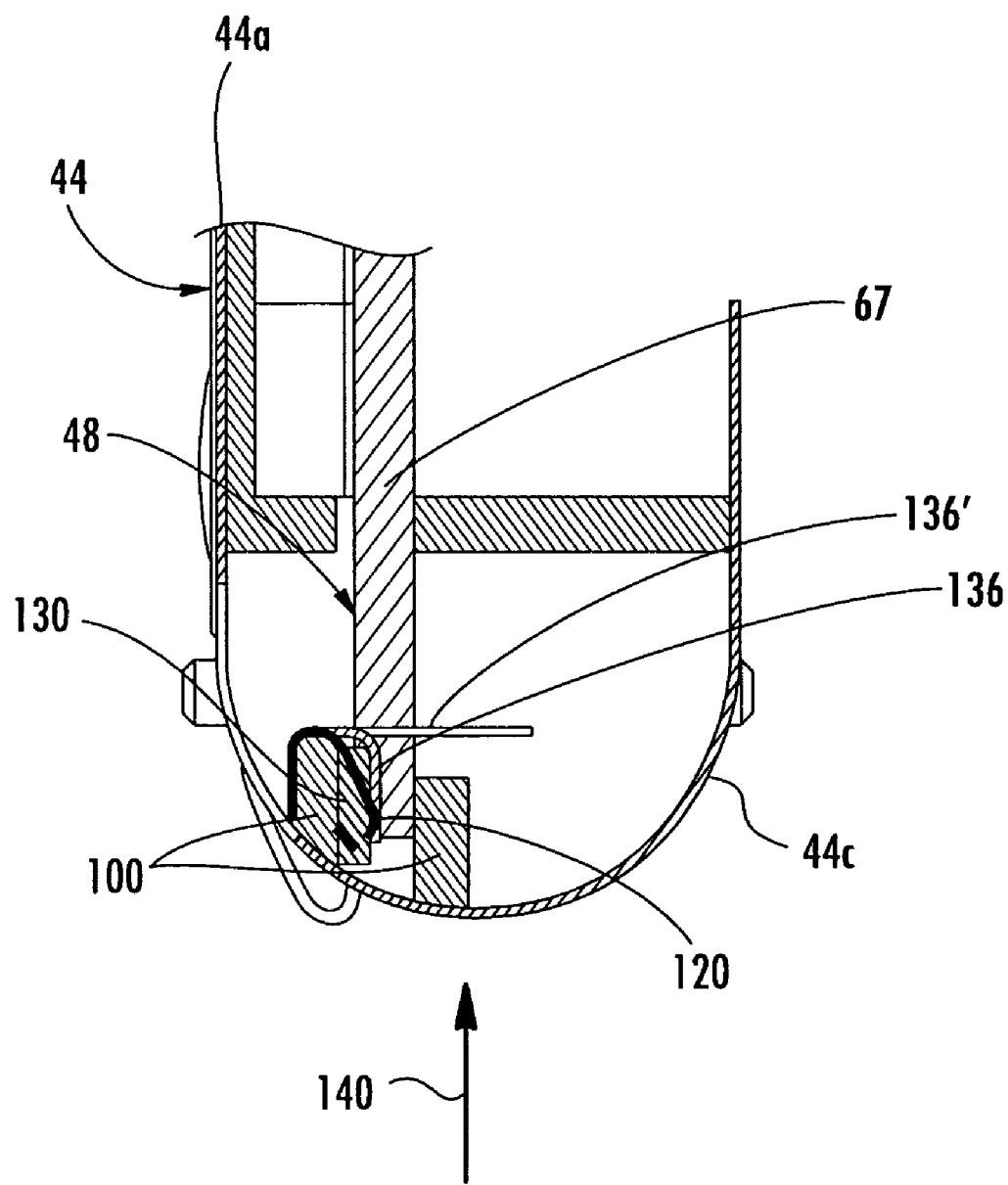
FIG. 7 is a sectional view showing the interconnection among the main circuit board, keyboard support, and keyboard circuit board.

FIGS. 7-9 show the assembly of the keyboard support 100, main circuit board 67 and keyboard circuit board 49 and the insertion direction of the various components by the arrow at 140.

During assembly, contact fingers 87b positioned on the main circuit board engage the conductive contacts 130 through receiving openings 150 formed on the underside 100b of the antenna support section 104, as shown in FIG. 6. The contact fingers 87b include portions of the circuitry 48 and pass through the openings and allow the interconnection of electrical circuitry on the main circuit board with the conductive traces forming an antenna circuit. The fingers 87b on the main circuit board extend into the openings 150, and when assembled, engage the conductive arms 120 positioned on the antenna section to allow interconnection of conductive traces for the antenna circuit to circuitry on the main circuit board. The spring finger or elastomeric pad 130 is also shown in detail in FIG. 7 to ensure connection of the antenna circuit to the circuitry on the main circuit board. A flex tail 136 is shown in an undeflected 136' and deflected position 136.

Another example of a hand-held mobile wireless communications device 1000 that may be used in accordance the present invention is further described in the example below with reference to FIG. 10. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 10:
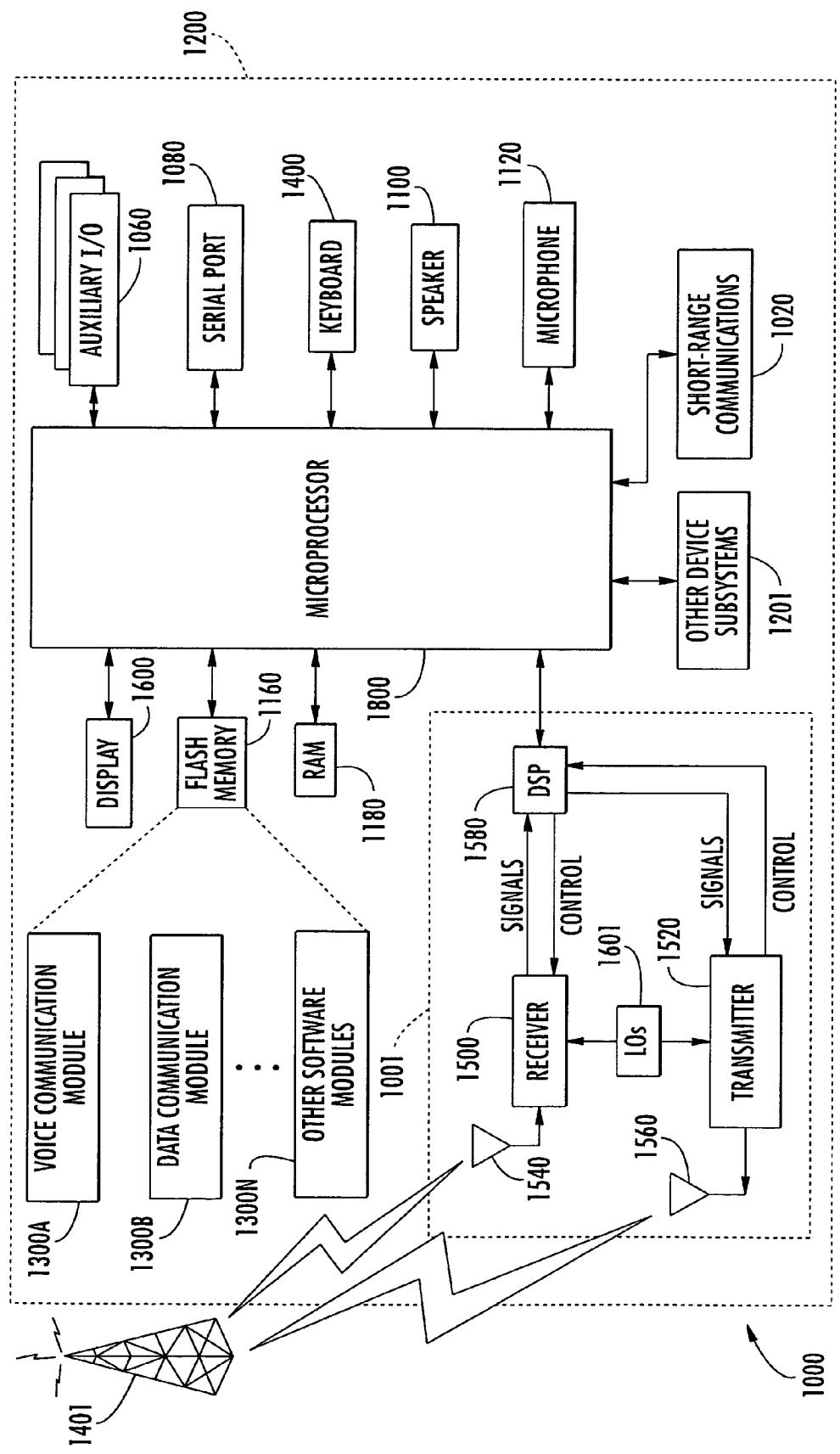
FIG. 10 is a schematic block diagram of an exemplary mobile wireless communications device for use with the present invention.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information. The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
   a housing having an upper portion and a lower portion;
   a main circuit board carried by the housing and having circuitry thereon;
   a keyboard circuit board carried by the lower portion of the housing and having keyboard and antenna sections, wherein keyboard circuitry is positioned on the keyboard section and connected to circuitry on the main circuit board and an antenna section configured as an antenna and positioned at the lower portion in the housing and having a pattern of conductive traces forming an antenna circuit and connected to said circuitry on the main circuit board.

2. A mobile wireless communications device according to claim 1, wherein said keyboard circuit board comprises a flex circuit.

3. A mobile wireless communications device according to claim 1, wherein said keyboard section is substantially planar configured.

4. A mobile wireless communications device according to claim 1, wherein said main circuit board has a lower portion and said antenna section straddles both sides of the lower portion of the main circuit board.

5. A mobile wireless communications device according to claim 1, wherein said circuitry on said main circuit board is disposed on one side.

6. A mobile wireless communications device according to claim 1, and further comprising an audio output transducer carried by the upper portion of said housing and connected to said circuitry on said main circuit board.

7. A mobile wireless communications device according to claim 1, and further comprising a keyboard support that engages the main circuit board and the keyboard circuit board and supports the keyboard section and antenna section.

8. A mobile wireless communications device according to claim 7, and further comprising contact arms on the antenna section that engage said keyboard support to aid in securing together the keyboard circuit board to the keyboard support.

9. A mobile wireless communications device according claim 1, and further comprising a compression connector that connects keyboard circuitry to circuitry on the main circuit board.

10. A mobile wireless communications device according to claim 1, and further comprising pins that align together the keyboard circuit board and the main circuit board.

11. A mobile wireless communications device according to claim 1, and further comprising conductive contacts positioned on the antenna section that interconnect the antenna circuit to circuitry on the main circuit board.

12. A mobile wireless communications device according to claim 11, wherein said conductive contacts comprise spring contacts.

13. A mobile wireless communications device comprising:
a housing having an upper portion and a lower portion;
a keyboard frame carried by the housing within the lower portion and having a substantially planar keyboard support section and antenna support section;
a main circuit board carried by the housing and having circuitry thereon and having a lower portion secured to the antenna support section of the keyboard frame;
a keyboard circuit board supported by the keyboard support and having keyboard and antenna sections, wherein keyboard circuitry is positioned on the keyboard section and connected to circuitry on the main circuit board and engaging and supported by the keyboard support section, and an antenna section configured as an antenna and having a pattern of conductive traces forming an antenna circuit and connected to said circuitry on the main circuit board, wherein said antenna section is supported by the antenna frame.

14. A mobile wireless communications device according to claim 13, wherein said keyboard circuit board comprises a flex circuit.

15. A mobile wireless communications device according to claim 13, wherein said main circuit board has a lower portion and said antenna section straddles both sides of the lower portion of the main circuit board.

16. A mobile wireless communications device according to claim 13, wherein said circuitry on said main circuit board is disposed on one side.

17. A mobile wireless communications device according to claim 13, and further comprising an audio output transducer carried by the upper portion of said housing and connected to said circuitry on said main circuit board.

18. A mobile wireless communications device according to claim 13, and further comprising contact arms on the antenna section that engage said keyboard support to aid in securing together the keyboard circuit board and keyboard support.

19. A mobile wireless communications device according to claim 13, and further comprising a compression connector that connects keyboard circuitry to circuitry on the main circuit board.

20. A mobile wireless communications device according to claim 13, and further comprising pins that align together the keyboard circuit board and the main circuit board.

21. A mobile wireless communications device according to claim 13, and further comprising conductive contacts positioned on the antenna section that interconnect the antenna circuit to circuitry on the main circuit board.

22. A mobile wireless communications device according to claim 21, wherein said conductive contacts comprise spring contacts.

23. A method for making a mobile wireless communications device, which comprises:
providing a housing having an upper portion and a lower portion;
connecting together a main circuit board having circuitry thereon and a keyboard circuit board having keyboard and antenna sections, wherein keyboard circuitry is on the keyboard section and connects to circuitry on the main circuit board and an antenna section configured as an antenna and having a pattern of conductive traces forming an antenna circuit and connected to said circuitry on the main circuit board and positioning the main circuit board and connected keyboard circuit board within the housing such that the keyboard circuit board is positioned at the lower portion of the housing.

24. A method according to claim 23, which further comprises forming the keyboard circuit board as a flex circuit board.

25. A method according to claim 23, which further comprises connecting the main circuit board and keyboard circuit board such that the antenna section straddles the main circuit board.

26. A method according to claim 23, which further comprises connecting a keyboard support to the main support board for supporting the keyboard circuit board.

* * * * *